United States Patent [19]
Chesack et al.

[11] Patent Number: 5,896,734
[45] Date of Patent: Apr. 27, 1999

[54] ROTATION DRIVE CONNECTION FOR A REEL MOWER

[75] Inventors: Gregory J. Chesack, Kenosha; Kenneth G. White, Racine, both of Wis.

[73] Assignee: Textron Inc., Providence, R.I.

[21] Appl. No.: 08/922,015

[22] Filed: Sep. 2, 1997

[51] Int. Cl.$^6$ .................................................. A01D 34/00
[52] U.S. Cl. ...................... 56/249; 56/7; 403/2; 403/359
[58] Field of Search .............................. 56/249, DIG. 20, 56/294, 7, 250; 403/2, 359

[56] References Cited

U.S. PATENT DOCUMENTS

| | | | |
|---|---|---|---|
| 258,698 | 5/1882 | Bissell . | |
| 1,900,062 | 3/1933 | Krenzke . | |
| 4,492,292 | 1/1985 | Thor ...................................... | 192/67 R |
| 5,131,782 | 7/1992 | Bruno et al. ............................ | 403/259 |
| 5,186,079 | 2/1993 | Gee .......................................... | 403/2 X |
| 5,318,375 | 6/1994 | Entrup et al. ............................ | 403/359 |
| 5,412,932 | 5/1995 | Schueler .................................... | 56/249 |
| 5,658,087 | 8/1997 | Butkovich et al. ...................... | 403/2 X |
| 5,682,735 | 11/1997 | Swenson et al. .......................... | 56/249 |

*Primary Examiner*—Terry Lee Melius
*Assistant Examiner*—Robert Pezzuto
*Attorney, Agent, or Firm*—Arthur J. Hansmann

[57] ABSTRACT

A lawn mower having a rotation drive connection assembly including a reel shaft having concially shaped opposite ends and an interior threaded length in each of the opposite ends. A drive coupler with a conical shape on one end thereof mates with one of the reel conical ends and has a threaded opening for receiving a screw extending into the shaft for holding the coupler thereon. A spline is on the end of the coupler opposite its one end, and there a drive member with a spline engaged with the coupler spline, all for rotating the shaft. A counter-balance is threadedly attached in the assembly adjacent the end of the shaft opposite the coupler location.

15 Claims, 3 Drawing Sheets

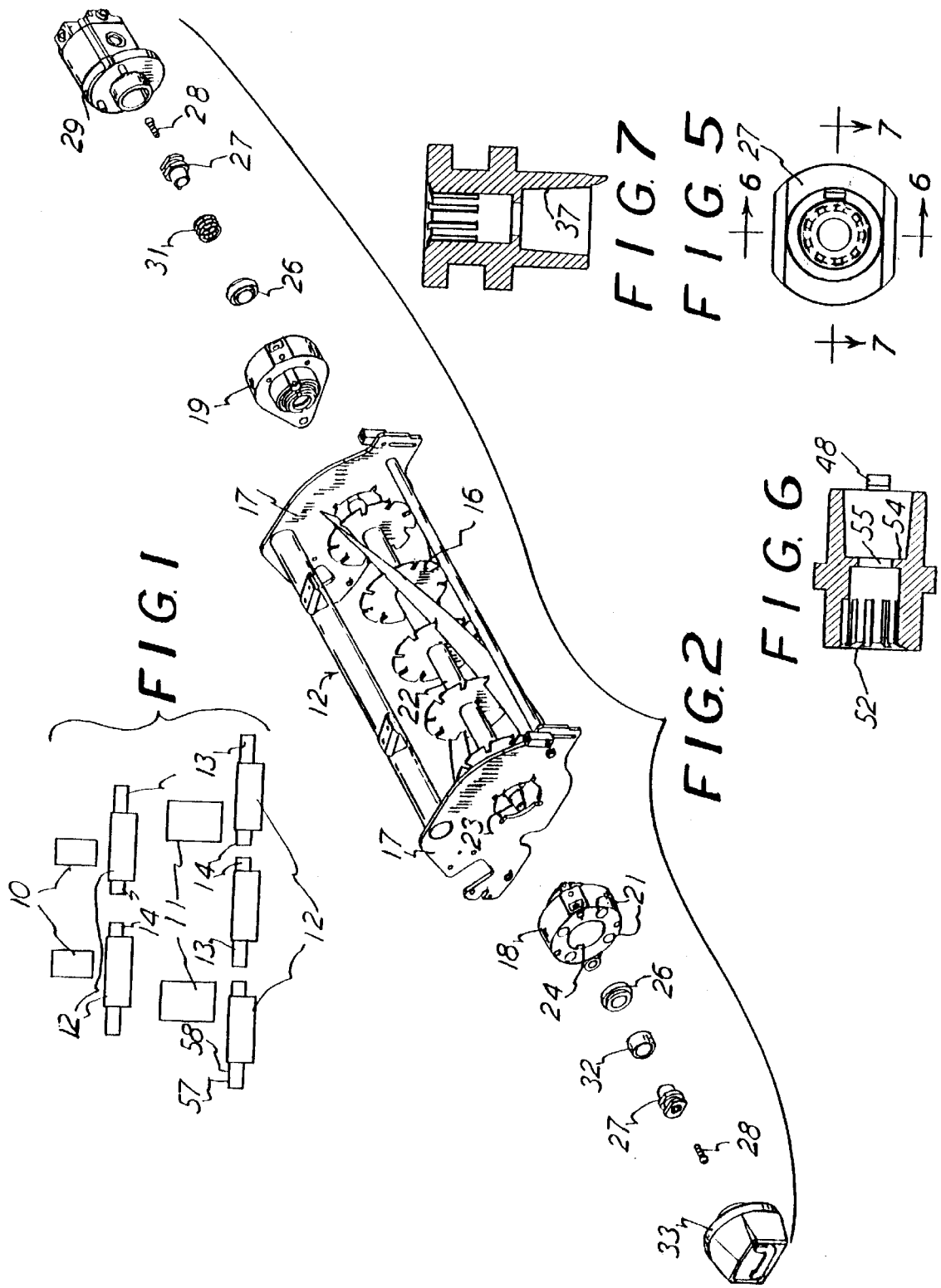

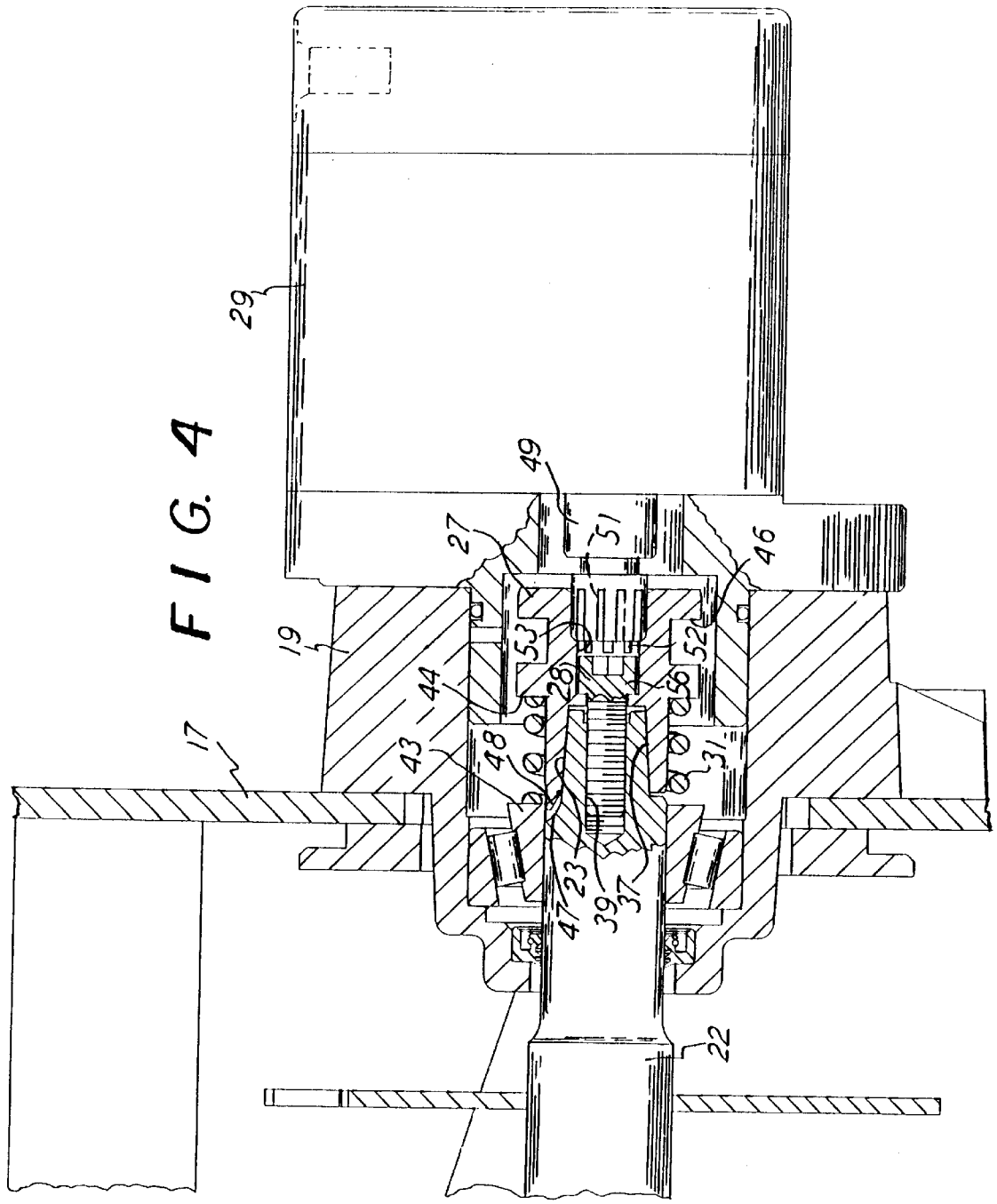

ROTATION DRIVE CONNECTION FOR A REEL MOWER

This invention relates to a rotation drive connection for a reel mower, and, more particularly, it relates to a drive connection from a driving motor to a lawn mower reel shaft.

BACKGROUND OF THE INVENTION

Motor drives for lawn mower reels are well known and they already exist in various forms, including spline types of drive connections between the motor and the reel shaft. In those prior arrangements where the motor and reel shaft are in direct drive, any damage to the motor shaft or the reel shaft entails a significant repair to either shaft.

The present invention provides for an intervening coupler between the reel shaft and the motor shaft so that if there is a damaging force between the driving motor and the reel shaft, it will be imposed upon the intervening coupler which can be either readily repaired or replaced in an expedient and relatively inexpensive procedure.

Further, the intervening coupler of this invention, as mentioned above, is in a friction relationship drive and thus structural damage to the shafts or the coupler itself is minimized.

Still further, the intervening coupler can be readily disposed at either end of the mower reel shaft so that the driving motor can then also be located at either end for the purpose of physically accommodating the presence of the motor at either end of the reel shaft. Of course the motor can then be of a bi-directional rotational type so that the reel will be rotated in a forward motion from either end of the reel shaft. Also, this arrangement where the motor can be at either end of the reel shaft accommodates the inclusion of a counterbalance member readily mounted on the opposite end of the reel shaft for balancing the weight of the motor. In all instances, the couplers are readily and easily attached to the axial end of the reel shaft by means of a single cap screw extending through the coupler and into the threaded end of the shaft. In that same context, the coupler is therefore readily removed from the shaft when the screw is removed.

Rotation support bearings are on each end of the reel shaft, and the coupler is axially fixed relative to the longitudinal axis of the reel shaft, and it presents a support for a compression spring which bears against the rotation bearing supporting the reel shaft. Also, that same coupler arrangement is utilized in axially restricting a cylindrical spacer between the coupler and the bearing at the opposite end of the reel shaft.

The reel shaft utilizes a bearing and a bearing seal and a taper, and this invention provides for the concentricity of those members in that they are supported on concentric surfaces which are formed in a grinding process achieved in one fixture setting of the reel shaft to thus assure the concentricity. In that arrangement, there is a process for making the drive connection mentioned herein.

BRIEF DESCRIPTION OF THE DRAWINGS

FIG. 1 is a top plan schematic view of the wheels of a lawn mower and five reel-type lawn mowers associated therewith, all in a conventional five-mower arrangement with this invention superimposed thereon.

FIG. 2 is an exploded perspective view of one reel and the members which will be attached at opposite ends of the reel.

FIG. 4 is an enlarged sectional view with the section being of the members on the right end of FIG. 2 and with the section being taken along the longitudinal axis of the reel shaft.

FIG. 5 is an end elevational view of the coupler of this invention.

FIG. 6 is a sectional view taken along the line 6—6 of FIG. 5.

FIG. 7 is a sectional view taken along the line 7—7 of FIG. 5.

DETAILED DESCRIPTION OF THE PREFERRED EMBODIMENT AND PROCESS

Figure 3:
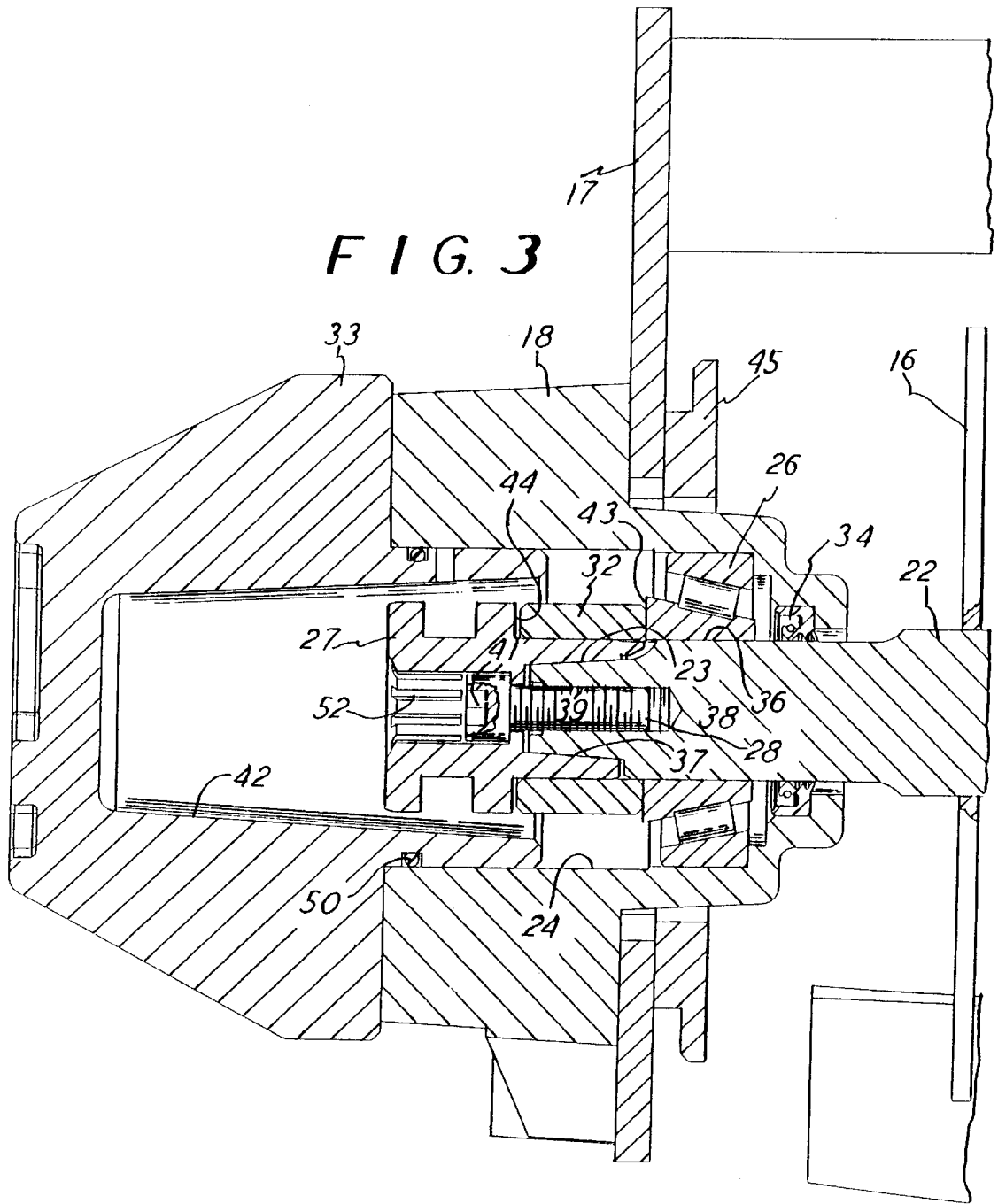
FIG. 3 is an enlarged sectional view of the left end of the members shown in FIG. 2 and with the section being along the longitudinal axis of the reel shaft.

FIG. 1 shows a top schematic view of conventional tractor front tires 11 and rear tires 10 which are part of a total conventional tractor (unshown herein but readily understood by one skilled in the art) and which supports five reel-type mowers 12. Of course the mowers 12 are arranged so that they cut individual swaths, but they overlap so that they cut one large total width. For that type of swathes individual cutting, it is significant that the powered mowers are arranged in their optimal positions and thus the extending end portions of the mowers must be accommodated in the space available. To this end, FIG. 1 indicates that the mowers each have drive connection components at opposite sides of the individual mower reels, and these components are generally represented as the motor drive end 13 and the weight counterbalance end 14 which is shorter than the other end, as indicated. Thus, as will be seen hereinafter, the drive end 13 and the counterbalance end 14 can be interchanged in location on each individual mower 12, and thus the optimum space utilization is achieved, as indicated in FIG. 1 where generally the shorter counterbalance ends 14 are adjacent each other on adjacent mowers, or at least there is no arrangement where the longer motor ends 13 are adjacent each other.

FIG. 2 shows one typical mower 12 which is shown to include a rotating cutting reel 16 and two spaced-apart mower frame members 17. The reel 16 is rotatably supported off the frame members 17, and rotation-bearing supports 18 and 19 are at each opposite side of the frame 17 and are suitably mounted to the frame 17, such as by bolts going through the holes 21 in the bearing supports 18 and 19 for attaching the supports to the frame pieces 17, conventionally, The mower reel 16 has a shaft 22 which extends through the frame 17 and which of course has a longitudinal axis extending centrally of the shaft 22 and in the direction between the frame 17. The opposite ends of the shaft 22 are tapered, that is they are frusto-conical at 23 in their external surfaces and at the extreme ends of the shaft 22. The shaft tapered ends 23 protect into respective central openings 24 in each of the bearing supports 18 and 19.

Also at each end of the shaft 22 and disposed within the respective bearing supports 18 and 19 when assembled, is a rotation-bearing 26 and a releasable coupler 27 and its attaching cap screw 28.

FIG. 2 then further shows that the right end, as Viewed in FIG. 2, includes a driving motor 29 and a compression spring 31. Also, the left end of FIG. 2 shows a cylindrical spacer 32 and a counterbalance 33. Accordingly, the same type of coupler 27 is at each end of the shaft 22, and also the same type of bearing support 18 and 19 is at each end, except for being left hand or right hand orientation. In that arrangement, the motor 29 can be positioned at either end of the shaft 22, and likewise the counterbalance 33 can positioned at either end. In either arrangement, the compression spring 31 is typically located on an opposite end of the shaft 22 from the axial component of the cutting force on the reel.

FIGS. 3 and 4 show the enlarged sectional views of the opposite ends of the shaft 22 and the respective mountings thereon, as just mentioned. FIG. 3 shows the bearing support 18 which contains a lubrication seal 34. The bearing 26 is snugly mounted on the cylindrical portion 36 of the shaft 22, and the coupler 27 is taper-mated with the frusto-conical or end taper 23 of the shaft 22. That is the couplers 27 have interior tapered and shown conical walls which conform to and define conical openings 37 which snugly match the respective tapers 23 of the shaft 22 for drive connection therein when a screw 28 interconnects the coupler with the shaft 22, as shown. Therefore the end of the shaft 22 has an axially threaded opening 39 which receives the screw 28 at each end thereof, and the screw 28 is a cap screw having its usual recess 41 for receiving a torquing tool for tightening the screw 28 in the shaft opening 39, as shown in both FIGS. 3 and 4.

FIG. 3 shows the weight counterbalance 33, which is fixed suitably in any conventional manner on its bearing support 18, to enclose the coupler 27 by receiving it in a central cavity 42 in the counterweight 33. Also, the cylindrical spacer 32 is shown disposed against the bearing surface 43 and is available at the other end to be restricted by the shoulder 44 of the coupler 27.

For further assembly of the bearing supports 18 and 19 on the frame 17, a ring retainer 45 extends with the frame plates 17 for the mounting of the bearing supports 18 and 19, in a conventional manner as will be understood and as mentioned herein. Also, an O-ring 50 extends around the interior 24 of the bearing supports 18 and 19 for sealing lubricant at the outer ends, relative to the opposite ends of the reel shaft 22.

FIG. 4 shows the end of the shaft 22 opposite from that end shown in FIG. 3, and here it will be seen that the motor 29 is suitably,and can be conventionally, connected to the bearing support 19 and thus have the motor 29 supported from the mower frame 17. It will be seen and understood that the shaft taper 23 and the interior taper surface 37 of the coupler 27 are mated together and are in friction-type rotation-drive relation through the force exerted therebetween by the cap screw 28. Of course, if and when it is desired to remove the coupler 27 from the shaft 22, then a conventional type of puller member (not shown) can be attached in the shouldered opening 46 of each coupler 27 and of course after the cap screws 28 have been removed from their inter-threaded connection between the couplers 27 and the threaded ends 39 of the shaft 22. Additionally, there is an interlock between the shaft 22 and the coupler 27, as shown by the notch 47 in the shaft 22, and a tang 48 on the coupler 27, and those two elements inter-engage in a type of key-drive rotation connection therebetween, when desired. FIG. 4 also shows the compression spring 31 shouldering between the coupler shoulder 44 and the bearing end 43, and thus the bearing 26 is held in position relative to the housing support 19 and of course on the shaft 22.

FIG. 4 also shows that the motor 29 has a splined shaft 49 which extends into the coupler 27 and which rotationally drivingly engages the coupler 27 by means of a spline drive because the coupler 27 also has splines thereon, so that the motor shaft splines 51 are in rotation drive connection with the coupler splines 52, such as shown in FIGS. 3, 6, and 7, as well as FIG. 4, Thus, the couplers 27 have central cylindrical openings 53 which have splines extending there-around for the spline engagement with the motor shaft 49. Of course if there is excessive impact between the motor shaft 49 and the reel shaft 22, it is arranged that the coupler 27 absorb that impact, and, if damaged, the coupler 27 can be replaced without the replacement of either of the more expensive shafts which it is interconnecting.

Thus, there is the cap screw 28 which releasably connects each coupler 27 to the end of the shaft 22, and thus the couplers have cylindrical shoulders 54 against which the screw head 56 can bear in order to hold the coupler 27 in tapered frictional drive relationship between the motor 29 and the shaft 22, as desired, The couplers 27 are therefore positioned at each end of the shaft 22, and thus the motor 29 can be at either end of the shaft 22 and they are bi-directional hydraulic motors which simply require that the hydraulic lines, such as indicated at 57 and 58 in FIG. 1, be the inlet and outlet lines only suitably connected to each motor 29 for the desired forward rotation of reel 16 in its conventional cutting action. Of course there would be a conventional hydraulic system of a pump for supplying the hydraulic pressure to each of the motors 29, but the pressure line 57 would be connected appropriately for the forward wheel drive, as mentioned and as would conventional.

What is claimed is:

1. A lawn mower having a rotation connection assembly comprising a rotatably mounted mower reel shaft having a longitudinal axis and a conically-shaped end portion extending co-axially with said axis, said shaft end portion having a threaded opening extending co-axially with said axis, a coupler having a conically-shaped wall defining a bore of the shape of said shaft conical end portion and extending co-axially with said axis and said wall being disposed in friction rotation drive contact with said concially-shaped shaft end portion and having a shoulder disposed transverse to said axis, a screw in said coupler and being threadedly connected with said shaft threaded opening and arranged to bear against said coupler shoulder in a manner to hold said coupler releasably mounted on said shaft and rotatable therewith through the rotation friction drive between the conical shapes, said coupler having a cylindrical opening co-axially disposed relative to said conical bore and at the end of said coupler opposite said one end and being disposed beyond said shaft and having a spline thereon, and a drive member with a splined shaft thereon releasably rotationally splined with said coupler at said opposite end of said coupler.

2. The lawn mower having a rotation drive connection assembly as claimed in claim 1, including a rotation drive interlock connection configured on both said reel shaft and said coupler for transmitting rotational drive therebetween.

3. The lawn mower having a rotation drive connection assembly as claimed in claim 1, including a bearing disposed at each axial end of said shaft for rotationally supporting said shaft, and a counter-balance member disposed adjacent the end of said shaft which is opposite said end portion and being arranged for counter balancing the weight of said drive member on said end portion.

4. The lawn mower having a rotation drive connection assembly as claimed in claim 1, including a bearing disposed at each axial end of said shaft and being mounted thereon for rotationally supporting said shaft, and a compression spring disposed between said coupler and the one of said bearings at said shaft end portion and being arranged for pressing on said one bearing to hold said one bearing in an axially fixed position on said shaft.

5. The lawn mower having a rotation drive connection assembly as claimed in claim 4, including an additional coupler being disposed on the axial end of said shaft opposite said shaft end portion, a spacer disposed between said additional coupler and the one of said bearings adjacent thereto for restricting axial movement of said adjacent one of said bearings.

6. The lawn mower having a rotation drive connection assembly as claimed in claim 5, wherein said couplers are shaped to include flanges which are engageable by a conventional axial puller tool for removal of said couplers from said shaft after said screws are removed.

7. The lawn mower having a rotation drive connection assembly as claimed in claim 4, including a reel mower frame disposed to flank said reel shaft, a rotation bearing support member mounted on said frame at each axial end of said shaft for rotationally supporting said bearings, and with said members having a cavity for receiving said bearings.

8. A lawn mower having a rotation drive connection assembly comprising:

a mower frame, a rotation bearing mounted on said frame, a mower reel shaft having a longitudinal axis and a tapered end portion extending co-axially with said axis and being mounted on said bearing and with said end portion having an axially extending threaded opening, a coupler having a conically-shaped bore defined by a conical wall therearound extending co-axially with said axis and with said bore having the conical profile of the size of that of said shaft end portion and being arranged to mate with said tapered end portion to have said wall in rotation friction drive therewith, and having a shoulder disposed transverse to said axis, a screw in said coupler and being threadedly connected with said shaft threaded opening and arranged to bear against said coupler shoulder in a manner to hold said coupler releasably mounted on said shaft and rotatable therewith, said coupler having a cylindrical opening co-axially disposed relative to said conical bore and being disposed beyond said shaft and having a spline thereon, and a drive member mounted on said frame and having a splined shaft rotationally splined with said coupler for imparting rotation to said shaft.

9. The lawn mower having a rotation drive connection assembly as claimed in claim 8, including a counter-balance member mounted in the assembly adjacent said shaft at the end thereof opposite from said shaft end portion.

10. The lawn mower having a rotation drive connection assembly as claimed in claim 8, wherein each opposite end of said shaft is shaped into a taper and a cylindrical surface for respectively receiving said coupler and one said bearing, and with said taper and said cylindrical surface being formed by grinding said shaft in one setting of said shaft to produce concentricity of said taper and said concentric surface.

11. A lawn mower having a rotation drive connection assembly comprising:

a mower frame, a rotation bearing support mounted on said frame, a mower reel shaft having a longitudinal axis and a tapered end portion on each end thereof, a bearing mounted on said support for rotationally supporting each end of said shaft on said frame, a coupler having a tapered wall defining an endlessly circular tapered bore mated with said shaft tapered end portion and with said wall being in rotation friction drive with said shaft tapered end portion and removably connected to either axial end of said shaft and being in rotational drive connection therewith and having a spline extending co-axially with said tapered bore and with said shaft, and a drive member having a spline thereon and being supported from said frame at either end of said shaft and being in spline drive with said coupler spline.

12. The lawn mower having a rotation drive connection assembly as claimed in claim 11, wherein said drive member is removably supported directly on said bearing support.

13. The lawn mower having a rotation drive connection assembly, as claimed in claim 11 including said axial end of said shaft has a cylindrically shaped seal support surface and a cylindrically shaped bearing support surface, a seal on said seal support surface, and a bearing on said bearing support surface.

14. The lawn mower having a rotation drive connection assembly as claimed in claim 11, wherein there is one said coupler removably connected to each axial end of said shaft, and with said couplers being arranged for each to be in selective spline drive with said drive member, for rotating shaft from either selective axial end of said shaft.

15. The lawn mower having a rotation drive connection assembly as claimed in claim 11, including a screw interconnected between said shaft and said coupler and being arranged to friction-connect said coupler onto said shaft for rotation drive therebetween.

* * * * *